United States Patent
Geisel

(10) Patent No.: US 8,653,411 B2
(45) Date of Patent: Feb. 18, 2014

(54) OPTIMIZED MACHINING OF A CONTOUR USING A PULSED TOOL

(75) Inventor: Mark Geisel, Gauting (DE)

(73) Assignee: MTU Aero Engines GmbH, Munich (DE)

( * ) Notice: Subject to any disclaimer, the term of this patent is extended or adjusted under 35 U.S.C. 154(b) by 1392 days.

(21) Appl. No.: 12/380,158

(22) Filed: Feb. 24, 2009

(65) Prior Publication Data

US 2009/0212032 A1    Aug. 27, 2009

(30) Foreign Application Priority Data

Feb. 27, 2008  (DE) .......................... 10 2008 011 425

(51) Int. Cl.
  *B23K 26/38*  (2006.01)
  *B23K 26/06*  (2006.01)
  *B23K 15/00*  (2006.01)

(52) U.S. Cl.
  CPC ............. *B23K 26/063* (2013.01); *B23K 15/002* (2013.01); *B23K 26/386* (2013.01)
  USPC ............. 219/121.72; 219/121.71; 219/121.78

(58) Field of Classification Search
  USPC ........ 219/121.6–121.86; 250/492.21, 492.22, 250/492.3; 700/166
  See application file for complete search history.

(56) References Cited

U.S. PATENT DOCUMENTS

| | | | | |
|---|---|---|---|---|
| 4,952,789 | A * | 8/1990 | Suttie | 219/121.68 |
| 5,223,692 | A * | 6/1993 | Lozier et al. | 219/121.67 |
| 6,168,676 | B1 * | 1/2001 | Seguin | 148/525 |
| 6,734,390 | B1 * | 5/2004 | Frye | 219/121.7 |
| 2005/0186538 | A1 * | 8/2005 | Uckelmann | 433/201.1 |
| 2006/0027544 | A1 * | 2/2006 | Pailthorp et al. | 219/121.71 |
| 2009/0045176 | A1 | 2/2009 | Wawers et al. | 219/21.67 |

FOREIGN PATENT DOCUMENTS

| | | |
|---|---|---|
| DE | 10 2005 047 328 | 7/2006 |
| DE | 10 2007 012 695 | 9/2008 |
| EP | 0 460 338 | 12/1991 |
| JP | 2007038287 | 2/2007 |

* cited by examiner

*Primary Examiner* — Henry Yuen
*Assistant Examiner* — Thien S Tran
(74) *Attorney, Agent, or Firm* — Davidson, Davidson & Kappel, LLC

(57) ABSTRACT

A pulsed machining method for the optimized machining of a contour which is characterized in that the instantaneous frequency ratio of $\phi$ of the pulse frequency of tool $f_L$ and of the rotational frequency of tool $f_{CNC}$ is optimized to achieve a highest possible degree of coverage of the individual machining pulses in the context of a shortest possible machining duration and without a direct concatenation of the machining pulses. It is especially preferred that this be achieved in that frequency ratio $\phi$ is an irrational number, thus cannot be expressed by the ratio of two whole numbers. By applying the method according to the present invention, a considerable time savings is achieved since there is no longer a need for time-consuming preliminary trials to ascertain an at least sufficient frequency ratio $\phi$.

13 Claims, 3 Drawing Sheets

OPTIMIZED MACHINING OF A CONTOUR USING A PULSED TOOL

Priority is claimed to German Application Serial No. DE 10 2008 011 425.1, filed Feb. 27, 2008, the entire disclosure of which is incorporated by reference herein.

BACKGROUND OF THE INVENTION

The present invention relates to a pulsed machining method for the optimized machining of a contour, the pulsed machining method, in particular, being a laser method, such as what as generally referred to as trepan processing, and the optimization being directed to the attainment of the best possible machining results, such as, in particular, the smoothest possible surfaces.

To an increasing degree, laser beams are being used as a tool for machining materials. The inherent advantage of a laser is, most notably, the lack of direct contact between the laser system and the workpiece, the result being virtually the absence of any kind of wear or abrasion. In addition, when the laser beam is properly focused, very small holes or holes having a very large aspect ratio can be bored.

To machine metallic or ceramic materials, for example, a multiplicity of different types of lasers are available, some of which function in what is generally referred to as continuous-wave operation, and others in what is generally referred to as pulsed operation. The method according to the present invention relates to the pulsed-operation machining method.

Since laser beams have a limited diameter, a hole having a larger diameter than that of the beam can only be produced with the aid thereof when the beam is guided in the manner of a milling cutter along a path, for instance a circular path; thus, when the tool is so to speak set into "rotation" at a circular frequency of $f_{CNC}$. This allows the quantity of machined material to remain low, so the result is a reasonable increase in the machining times. At the end of the machining process, the unmachined cut-out material can be released from the cut-out contour. This machining process, in conjunction with a pulsed tool, is also referred to as "trepanning."

In pulsed operation, the laser system emits only short, but very high-energy laser pulses of frequency $f_L$. Due to the locally high energy input, material is vaporized; thus, in the optimal case, no molten material would be produced which would have to be expelled and could lead to impurities and to a degradation of the surface quality. However, the case where the material merely becomes molten and must be expelled (for example, due to the high pressure pulse during rapid heating) is also often encountered in the art and, depending on the material to be machined, is unavoidable or is even desired.

The following problem arises during trepanning:

Since, in most cases, the diameter of the tool (pulsed laser beam) is significantly smaller than the diameter of the hole to be bored, respectively the dimensions of the contour to be cut out, the cut-out material can only be completely removed when all of the material ablations produced by the pulses a) adjoin one another and b) extend through the entire material thickness.

This can be accomplished in different ways:
increasing the machining frequency;
very slow, one-time traversal of the contour, so that each individual ablation partially covers the respective last one;
repeated traversal of the desired contour, so that the coverage is achieved following a certain number of "rotations" of the tool.

During each rotation, only one layer of a specific thickness is removed; by repeatedly traversing the contour, thus for a plurality of rotation cycles, as many layers as necessary are removed until the component has been machined through the entire thickness thereof.

In the first case, there are technical limits which must not be exceeded. Moreover, in the process, the advantage of a locally narrowly limited heat input, which is essential in high-precision applications, is lost, in particular, since the workpiece frequently becomes distorted by the one-sided heat input which leads to corresponding deviations in the machining. There are also a number of materials (for example, ceramics) which are only ablatable in response to very high-energy pulses of the kind that continuous-wave lasers are not able to produce.

In the second case, a long machining duration usually follows; in conjunction with the previously mentioned disadvantage of a one-sided heat input, this variant leads to less than satisfactory results.

A procedure in accordance with the third case may absolutely lead to good results since, in this case, the heat input is effectively distributed, so that component distortion plays no or only a minor role. The machining times are dependent on the selection of the parameters (pulse frequency $f_L$ of the tool, rotational frequency $f_{CNC}$ of the tool relative to the contour) and are only short enough when a best possible coverage of the individual machining pulses is achieved in the context of a lowest possible number of rotations. It is difficult to set these parameters, in particular the tuning of rotational frequency $f_{CNC}$ and pulse frequency $f_L$ to one another, since they are dependent on the particular component and the laser parameters and, under known methods heretofore, for example, necessitate complex calculations or time-consuming trials. Alternatively, one must accept needlessly long machining times and/or suboptimal machining results.

SUMMARY OF THE INVENTION

Accordingly, the object of the present invention is to devise a pulsed machining method for the optimized machining of a contour, in particular, to devise a method for the optimized tuning of rotational frequency $f_{CNC}$ and pulse frequency $f_L$ of a pulsed machining method.

The objective is achieved by the a pulsed machining method for machining a contour of a workpiece using a beam tool, wherein the instantaneous frequency ratio $\phi$ of the pulse frequency of tool $f_L$ and of the rotational frequency of tool $f_{CNC}$ is adjusted for traversing around a predefined workpiece contour in such a way that a high degree of coverage of individual machining pulses is achieved in the context of an optimized number of rotations of the tool. Accordingly, it is suggested that the instantaneous frequency ratio of $f_{CNC}$ to $f_L$, referred to in the following as $\phi$, be selected in a way that makes it possible to achieve a highest possible degree of coverage of individual machining pulses.

A method is devised by the present invention which enables frequency ratio $\phi=f_{CNC}/f_L$ to be optimized in such a way that, given a lowest possible number of rotations of the tool, a highest possible degree of coverage of the individual machining pulses is achieved. It is especially preferred that this be achieved by selecting ratio $\phi$ to be irrational, thus, for $\phi$ not to be representable by the ratio of two whole numbers to one another.

The following explanations are presented based on the example of a circular path (circular bore) to be machined. However, they may be applied analogously to any other given contours.

The circular path to be machined is characterized by its radius which corresponds to bore radius r. The tool moves at a feed rate v on this path. The relation $$f_{CNC} = v/2\Pi r$$

is derived herefrom for the rotational frequency of the tool.

In this context, the discrete sequence of pulses may be represented by the following formulas:

$$x_i = r \cos(2\pi\phi t_i) \text{ for } t_i = 0, 1, 2, \ldots \quad (1.1)$$

$$y_i = r \sin(2\pi\phi t_i) \text{ for } t_i = 0, 1, 2, \ldots \quad (1.2)$$

in this case, $t_i$ is the continuous index for the points in time when a machining pulse is emitted. $x_i$ and $y_i$ are the corresponding coordinates in two-dimensional space. In response to a variation in frequency ratio $\phi$, widely varying dynamic effects are manifested in equations 1.1 and 1.2. Periodic, quasiperiodic or even deterministically random movement patterns may arise as a function of $\phi$. In this context, the aperiodic processes are especially significant for the present invention.

It is noted that formulas 1.1 and 1.2 merely represent a two-dimensional section (Poincaré section) of the general sequence of movements. On the other hand, a three-dimensional phase space would be needed to describe the entire dynamic system, since the motion of the quasiperiodic process takes place on the surface of a torus which is embedded in a three-dimensional phase space. It should be additionally noted in this context that the requirement that the trajectory of motion of the process not intersect itself (freedom from overlap) is fulfilled.

Accordingly, the method according to the present invention relates to a pulsed machining method for the optimized machining of a contour which is characterized in that the instantaneous frequency ratio of $\phi$ of the pulse frequency of tool $f_L$ and the rotational frequency of tool $f_{CNC}$ (thus, the quotient of $f_L$ and $f_{CNC}$) is optimized to achieve a highest possible degree of coverage of the individual machining pulses in the context of a shortest possible machining duration and without a direct concatenation of the machining pulses.

In accordance with a first specific embodiment, the contour may be a circular path; in accordance with another specific embodiment, it may have a regular shape, such as a square or a star, for example; and, in accordance with other specific embodiment, it may have any given shape.

In accordance with one specific embodiment, the contour is open. In accordance with one preferred specific embodiment, the contour is intrinsically closed.

The machining method is directed to traversing this contour and to effecting that the contour is cut out by removing the material, so that, in the case of an intrinsically closed contour, the material surrounded by the contour is released from a composite construction. A direct concatenation of the material ablations produced by the pulses is not desired since an increased local energy input results herefrom, which, for example, may result in deformation on the component to be machined.

Because of the pulsed nature of the machining method, the desired cutting-out may only take place when, during the machining duration, at every location where material to be removed is located, at least so many machining pulses of frequency $f_L$ impinge that the entire layer thickness of the material is ablated. In accordance with one preferred specific embodiment, the pulses impinge in a spatially distributed manner; nevertheless, upon completion of the machining, at every location where there is material to be ablated, at least so many machining pulses of frequency $f_L$ arrive that the entire layer thickness of the material is ablated. In accordance with one especially preferred specific embodiment, precisely as many pulses as needed impinge, so that the result is a minimization of the number of pulses, and thus of the machining duration, as well as a reduction in the machining temperature as a result of a temporal and local distribution of the energy input.

Characteristic of an optimal matching between parameters $f_L$ and $f_{CNC}$ is the ratio of the two parameters to one another, which is termed frequency ratio $\phi$. The method according to the present invention optimizes $\phi$ in a way that makes it possible to obtain a highest possible degree of coverage of the individual machining pulses in the context of a shortest possible machining duration and without a direct concatenation of the machining pulses.

In accordance with one preferred specific embodiment of the method according to the present invention, a laser or an electron beam source is used as a tool. In the process, both the laser as well as the electron beam source are operated in pulsed mode, i.e., they do not supply their energy, which is converted into heat on a workpiece and thereby leads to the ablation of material, continuously, but rather in temporally discrete "bundles," thus in a pulsed form.

In accordance with one especially preferred specific embodiment of the method according to the present invention, frequency ratio $\phi$ is irrational. Thus, $\phi$ may not be represented by the ratio between two whole numbers. This ensures that one and the same location on a contour to be traversed by a pulsed tool only experiences one single machining pulse, even when the contour is traversed multiple times. On the other hand, if $\phi$ were able to be represented as a rational number, for example, if $\phi$ were 0.1, and if this value came into existence as the result of $f_{CNC} = 1$ and $f_L = 10$, then ten machining pulses would be uniformly distributed over the contour, and, following one rotation of the tool, respectively of the workpiece, the eleventh pulse would arrive at the same location as the first pulse, which is not desired in accordance with the present invention, since this type of complete coverage of the machining pulses would result in a poor machining outcome, to the point of rendering the machining impossible. This impossibility arises because, even given an unlimited machining duration, specific locations on the contour are reached any number of times; others, however, are never reached, so that the contour is never completely ablated, which, in the case of an intrinsically closed contour, also does not permit any complete removal of the cut-out material.

In accordance with one especially preferred specific embodiment, the mathematical constant $\Pi$ is able to be represented as the product of frequency ratio $\phi$ and of (another) rational number. Thus, the number $\Pi$ is included in $\phi$, and, in accordance with another specific embodiment, may even be $\Pi$ itself; the other rational number would then be 1.

In accordance with one especially preferred specific embodiment, Euler's number is representable as the product of frequency ratio $\phi$ and of a rational number. In accordance with another especially preferred specific embodiment, the "golden number" is representable as a product of frequency ratio $\phi$ and of a rational number. In this context, the "golden number" is derived from what is commonly known as the "golden section." Accordingly, two sections have precisely the ratio of the golden section to one another when the larger section is in the same ratio to the smaller section, as is the sum of the two sections to the larger section. This ratio is referred to as "golden number;" (rounded to three digits), it is 1.618.

In accordance with other preferred specific embodiments, the numbers originate from the group including X, Y or Z coordinates and, analogously to the above description, are representable as a product of frequency ratio φ and a rational number.

In another especially preferred specific embodiment, an optimized frequency ratio φ may also be ascertained for cases where φ does not necessarily have to have an irrational ratio. It may be demonstrated that, at point in time $t_{i+1}$ and $t_i$, Cartesian distance φ1 between two machining steps is $$\Delta 1(t_{i+1}-t_i) = |2r \sin(\pi \phi (t_{i+1}-t_i))|$$

It may also be demonstrated that, for a finite number of laps U around the contour, a uniform φ1 is always reached when $$\phi = \frac{U}{K} \text{ where } U, k \in N \text{ and are prime.}$$

This embodiment has the advantage that the spacing between two machining pulses may be directly predefined, which is desirable from a technological standpoint.

Up until this point, the assumption in the descriptions has been that the tool moves along the contour and that the workpiece is stationary. On the other hand, in accordance with another specific embodiment of the method according to the present invention, instead of the tool, the workpiece moves. In particular, when working with a simple circular path as a contour, it is advantageous when the workpiece turns instead of the tool; this is especially true when the workpiece is rotationally symmetrical or even when it has a round cross section. All of the mentioned specific embodiments also apply without qualification to the specific embodiment mentioned here.

In accordance with another specific embodiment, both the tool, as well as the workpiece move in relation to one another. Crucial is merely that the contour be precisely hit again each time when it is traversed multiple times.

BRIEF DESCRIPTION OF THE DRAWINGS

All of the figures show the sites which are exposed to the action of the machining pulses, these sites residing on a circular path having a radius of 0.25 mm. The pulses were emitted by a laser. The total number of machining pulses in each figure is 150; pulse frequency $f_L$ is 15 pulses/second. In particular, the present invention is described below by reference to the following drawings, in which.

DETAILED DESCRIPTION

Figure 1:
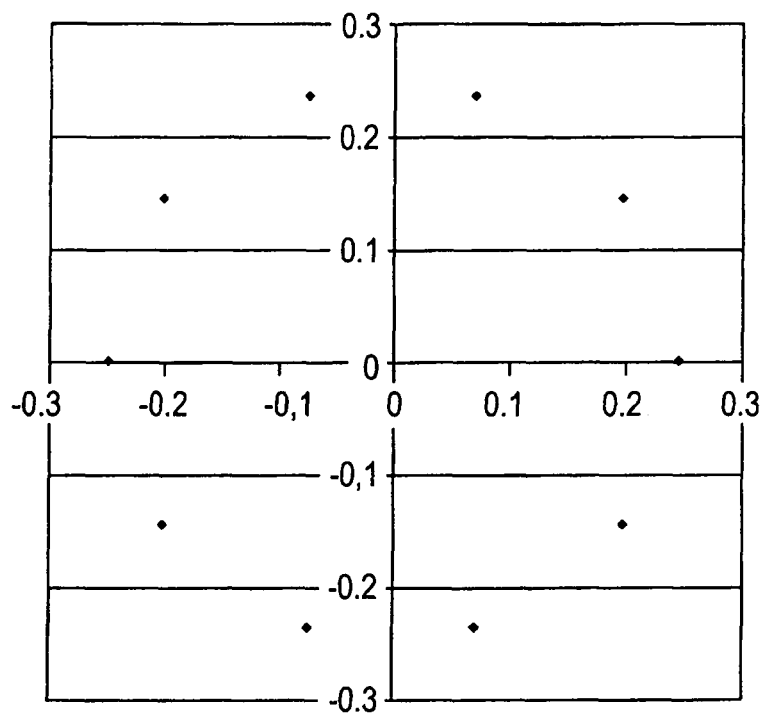
FIG. 1 shows the position of the machining pulses at a frequency ratio φ of 10.

FIG. 1 shows the position of the machining pulses at a frequency ratio φ of 10. All of the pulses are distributed over 10 exposure sites which are characterized by the dark-colored points. Although altogether 150 individual pulses were emitted, the degree of coverage is so high that the pulses hit the same locations again and again, and the largest portion of the contour, which is circular here, is virtually never machined.

Figure 2:
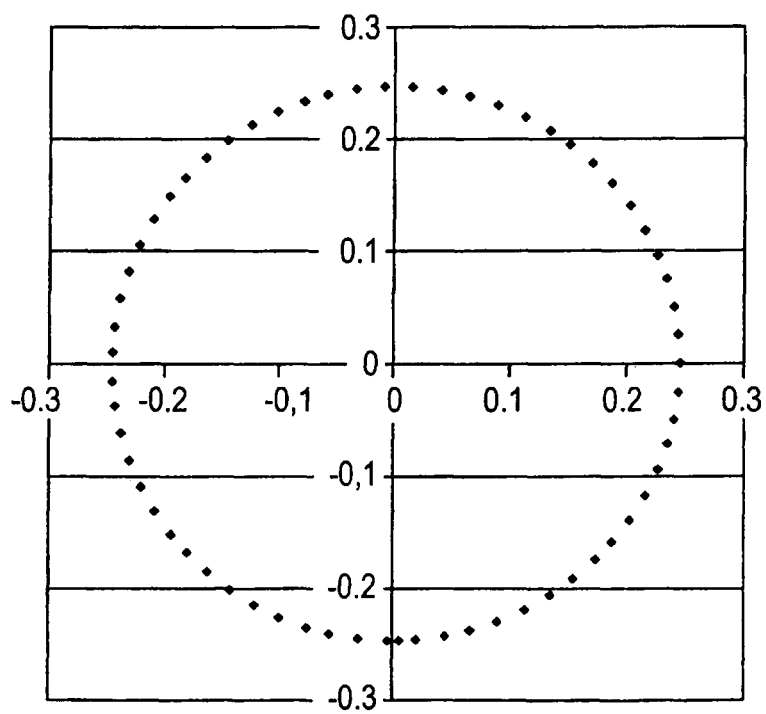
FIG. 2 shows the position of the machining pulses at a frequency ratio φ of 31.5.

On the other hand, in FIG. 2, frequency ratio φ is 31.5, thus, is not yet irrational; however, the machining already shows a significantly improved result. The value for φ was ascertained using time-consuming trials.

Figure 3:
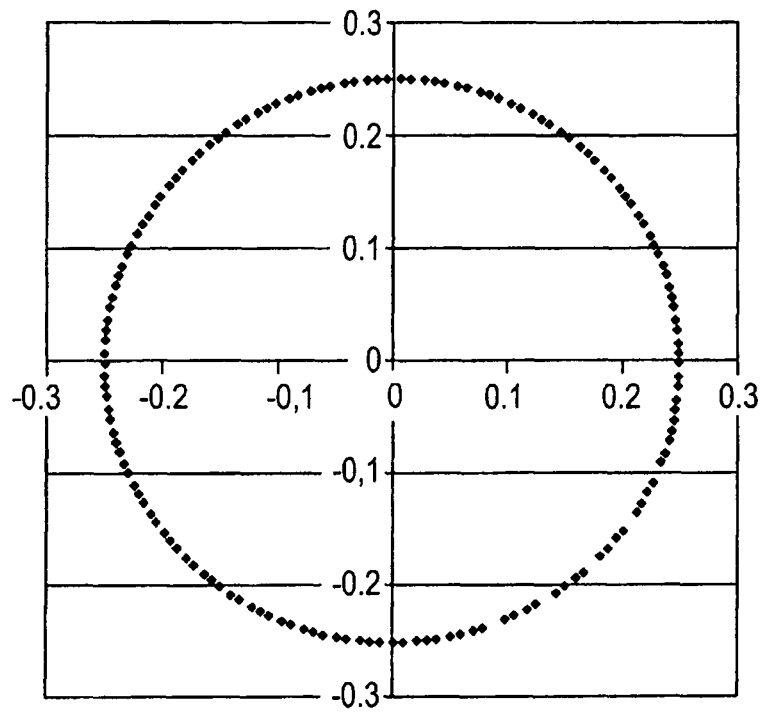
FIG. 3 shows the position of the machining pulses at a frequency ratio φ of 10 Π.

Finally, FIG. 3 shows the machining result for a slightly different value of frequency ratio φ. It is currently 10 Π in the illustrated case. In spite of the very small change, which, in this case, occurred due to a change in feed rate v of approximately 1%, a significant improvement in the machining result is again discernible. In this case, φ is already an irrational number, namely a multiple of the mathematical constant Π. In the illustrated case, it was not necessary to find optimal frequency ratio φ by trial, as was previously the case; rather it was able to be directly ascertained by applying the inventive teaching. Consequently, both a considerable time savings, as well as improved machining results are thereby achieved since the machining pulses are distributed much more effectively along the contour. Shorter machining times are also achieved since, due to the improved distribution, fewer rotations of the tool relative to the workpiece are needed to reach all desired locations a sufficient number of times.

Figure 4:
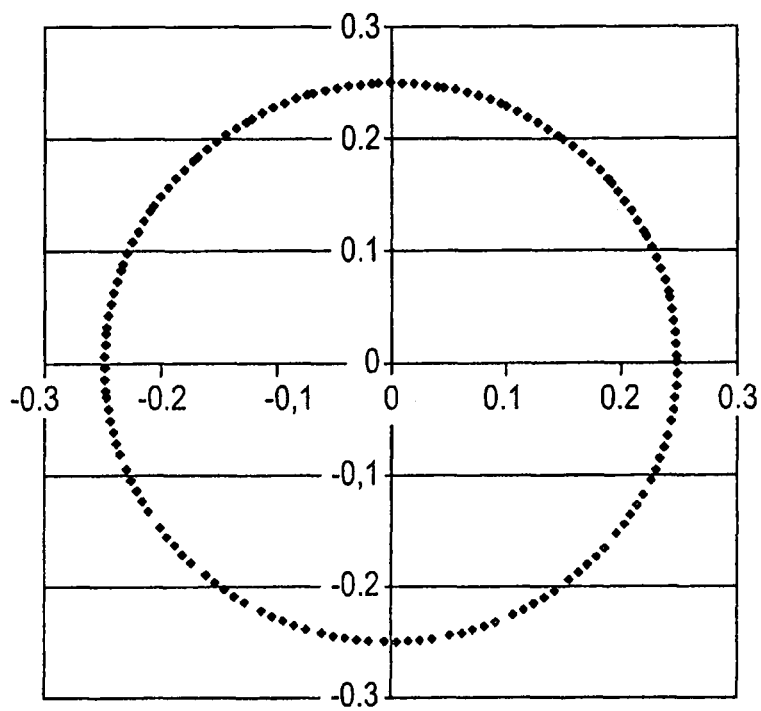
FIG. 4 shows the position of the machining pulses at a frequency ratio φ that is a function of Euler's number e.

Analogously to FIG. 3, FIG. 4 shows the machining result for the case where, in place of the mathematical constant Π, Euler's number e is used as a basis for frequency ratio φ. In this case as well, a significant improvement is clearly discernible in comparison to the machining results illustrated in FIGS. 1 and 2. The coverage of the machining pulses is highly efficient when the method according to the present invention is used, since the pulses of one rotation do not overlap. However, after a few rotations (here, approximately 10 rotations are illustrated), a good and uniform coverage of the entire contour to be machined is evident.

Figure 5:
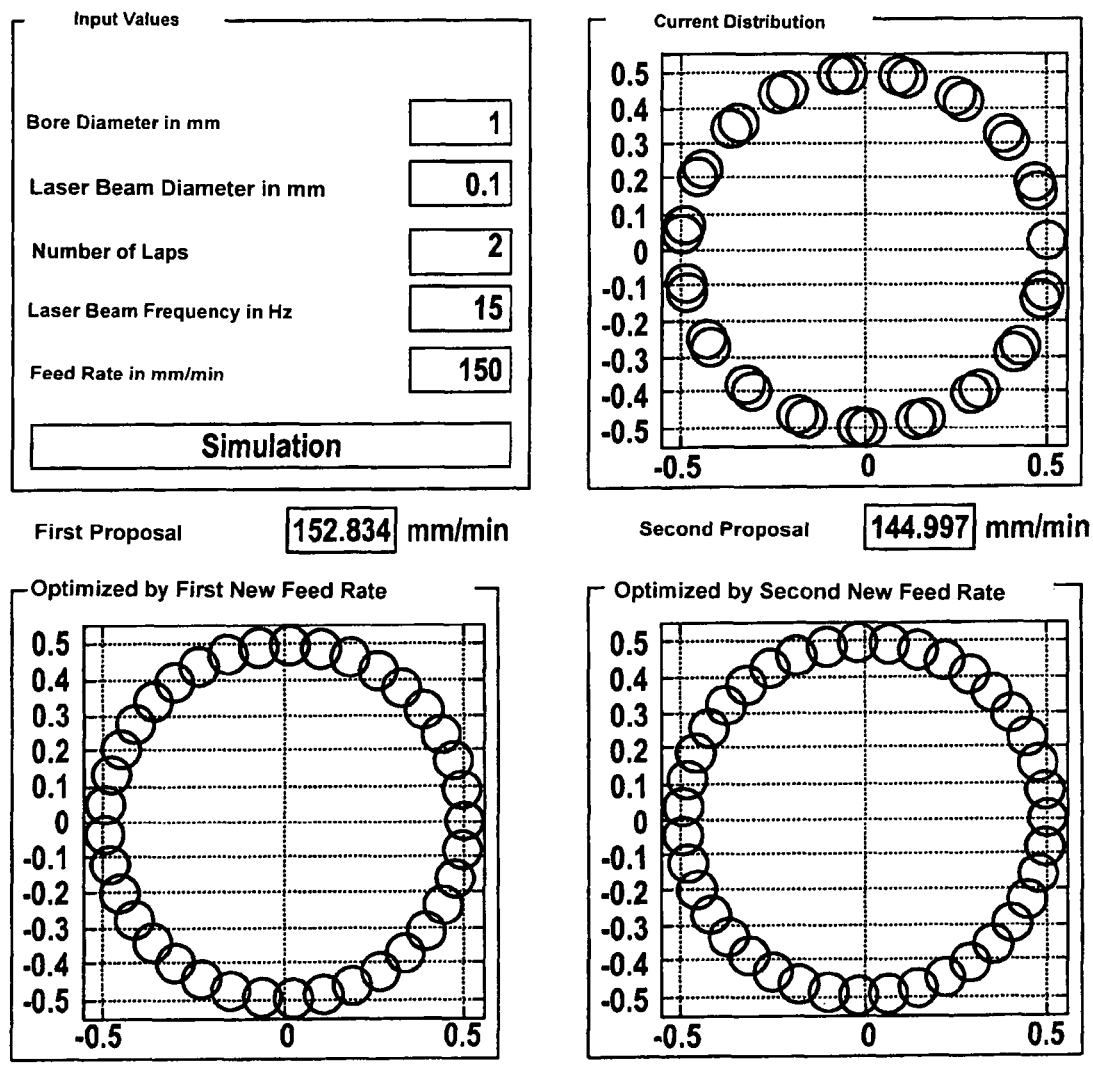
FIG. 5 shows a table of input values and three graphs of simulations showing distributions of machining pulses of different feed rates.

FIG. 5 shows a table of input values and three graphs of simulations showing distributions of machining pulses of different feed rates. In the upper left quadrant a table of input values includes a bore diameter of 1 mm, a laser beam diameter of 0.1 mm, 2 laps, a laser beam frequency of 15 Hz and a feed rate of 150 mm/min. In an upper right quadrant a graph of a "current distribution" is shown based on a simulation using the input values in the table, where the feed rate is 150 mm/min. In a lower left quadrant a graph shows a distribution of a simulation wherein the feed rate of 150 mm/min is replaced with a first new feed rate of 152.834 mm/min and in a lower left quadrant a graph shows a distribution of a simulation wherein the feed rate of 150 mm/min is replaced with a second new feed rate of 144.997 mm/min, thereby generating a more optimal distribution of machining pulses by setting frequency ratio φ as an irrational number.

| REFERENCE NUMERAL LIST AND ABBREVIATIONS | |
|---|---|
| $f_{CNC}$ | rotational frequency of the tool |
| $f_L$ | pulse frequency of the tool |
| Φ | frequency ratio |
| r | bore radius |
| v | feed rate |
| t | time |
| X | X coordinate |
| Y | Y coordinate |
| Z | Z coordinate |
| e | Euler's number |

What is claimed is:

1. A method of pulsed machining of a contour of a workpiece with a beam tool, the method comprising the step of: pulsing a beam tool and creating a movement between the beam tool and a workpiece to machine a predefined contour of the workpiece, the pulsing and the creating a movement being such that an instantaneous frequency ratio φ of a pulse frequency $f_L$ of the beam tool and a rotational frequency $f_{CNC}$ is adjusted in such a way that machining pulses are distributed in a number of locations along the predefined contour of the workpiece, the rotational frequency $f_{CNC}$ being one of a rotational frequency of the beam tool with respect to the predefined workpiece contour or a rotational frequency of the predefined workpiece contour with respect to the beam tool; and setting the frequency ratio φ as an irrational number or setting the frequency ratio φ as a quotient U/k, where U and k are prime numbers.

2. The method as recited in claim 1 wherein the beam tool is a laser source.

3. The method as recited in claim 1 wherein the beam tool is an electron beam source.

4. The method as recited in claim 1 wherein the frequency ratio φ is set as the irrational number.

5. The method as recited in claim 1 wherein the frequency ratio φ is set as a quotient of the mathematical constant Π and of a rational number.

6. The method as recited in claim 1 wherein the frequency ratio φ is set as a quotient of Euler's number e and of a rational number.

7. The method as recited in claim 1 wherein the frequency ratio φ is set as a quotient of the golden number and of a rational number.

8. The method as recited in claim 1 wherein the frequency ratio φ is set as a quotient of a number selected from a group including X, Y and Z coordinates and of a rational number.

9. The method as recited in claim 1 wherein the frequency ratio φ is set as the quotient U/k.

10. The method as recited in claim 1 wherein the creating the movement between the beam tool and the workpiece involves moving the beam tool with respect to the workpiece.

11. The method as recited in claim 10 wherein the moving the beam tool with respect to the workpiece involves rotating the beam tool about the workpiece so that the beam tool follows a path corresponding to the predefined contour of the workpiece.

12. The method as recited in claim 1 wherein the workpiece is moved with respect to the beam tool.

13. The method as recited in claim 1 wherein the beam tool is moved with respect to the workpiece and the workpiece is moved with respect to the beam tool.

* * * * *